Oct. 27, 1942.  C. E. HEMMINGER  2,300,151
ART OF TREATING HYDROCARBONS
Filed Dec. 16, 1939
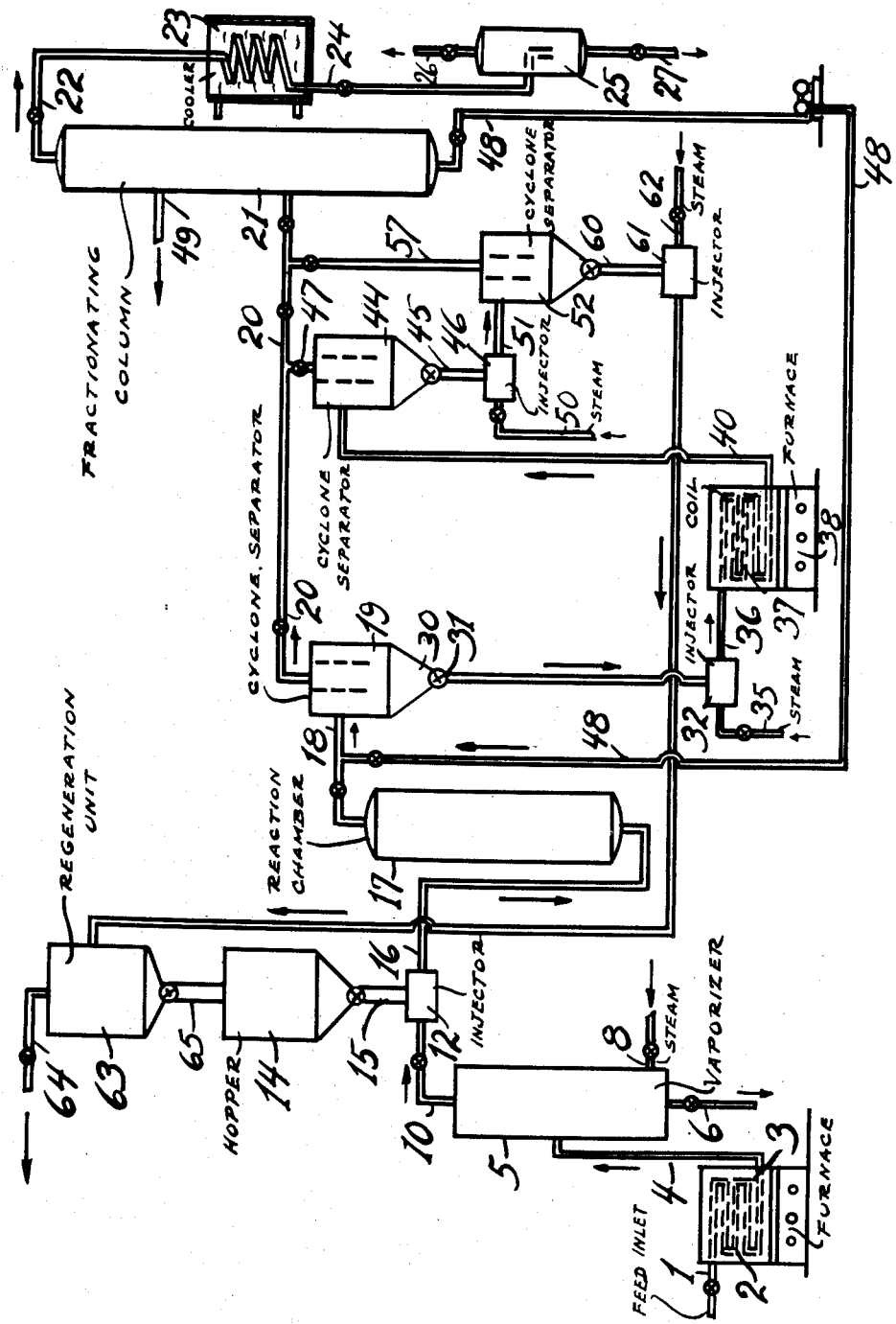
Charles E. Hemminger Inventor
By P. L. Young Attorney Patented Oct. 27, 1942

2,300,151

UNITED STATES PATENT OFFICE 2,300,151

ART OF TREATING HYDROCARBONS

Charles E. Hemminger, Westfield, N. J., assignor to Standard Oil Development Company, a corporation of Delaware Application December 16, 1939, Serial No. 309,515

6 Claims. (Cl. 196—52)

The present invention relates to improvements in the art of converting hydrocarbons into motor fuels. More particularly, the present invention relates to processes such as cracking, reforming, desulfurizing and the like, wherein the hydrocarbons to be converted are vaporized, a catalyst is suspended therein and the suspension is conducted to a reaction zone where it is subjected to the proper conditions of temperature, pressure and time resident in the said zone to effect the desired conversion.

In the catalytic cracking of for example a vaporized gas oil, in which a catalyst is suspended, and wherein the gas oil is undergoing cracking in a reaction zone, the procedure heretofore generally employed, after removal of the reaction products from the reaction zone, was to separate the catalyst from the reaction products in a separation zone by some suitable devices such as cyclone separators. One difficulty encountered in this type of operation is that appreciable amounts of hydrocarbons are adsorbed or occluded on or in the catalyst and during the customary purging operation, which is normally carried out just prior to regeneration of the catalyst, appreciable amounts of hydrocarbons are not recovered from the catalyst. My invention comprises, essentially, heating the catalyst which has been recovered from the separation zone so as to recover useful hydrocarbons which have become adsorbed on the surface of or occluded within the body of the catalyst. I accomplish this result, in one form of my invention, by discharging the catalyst recovered from the separation zone into a suitable heating device such as a fired coil where the temperature of the catalyst is increased to a temperature of about 1000° F. or higher, whereupon adsorbed or occluded hydrocarbons are substantially removed from the catalyst. I also provide several alternative methods for recovering this additional amount of adsorbed or occluded hydrocarbons.

It should be stated in connection with the mechanism of my improved process that when the catalyst which has been separated from the main portion of the reaction vapors is heated, the tarry or pitchy hydrocarbons which are deposited on the catalyst as a result of the cracking operation are subjected to destructive distillation and coking whereby normally gaseous hydrocarbons such as methane and the like are removed and a final residue is left on the catalyst which is a highly carbonaceous material containing usually only about 1 to 5% hydrogen.

To the accomplishment of the foregoing and related ends, I provide a continuous process and a suitable apparatus for carrying out said process as will fully appear from the disclosure contained in the present description and claims, reference being had to the accompanying drawing.

The drawing represents diagrammatically and in partial vertical section a suitable combination of elements in which my invention may be performed.

Referring in detail to the drawing, a feed stock such as West Texas gas oil having a mid boiling point of about 700° F. and an A. P. I. gravity of about 25° is introduced into the system through line 1 and from there discharged into the coil 2 of a furnace setting 3 of the usual type and construction employed in oil refineries for heating the hydrocarbon oil. In this preheater, the oil attains a temperature such that when discharged into line 4 it is a temperature of about 900° F. and at this temperature, it is discharged into a vaporizer 5. Steam may be admitted near the bottom of the said vaporizer through line 8 to assist the vaporization operation. The temperature of the steam may be about 825° to 900° F. The pressure maintained within the vaporizer 5 is of the same order as that maintained in coil 2, namely about ten pounds per square inch gauge. The unvaporized material is withdrawn through line 6 from the bottom. The amount of this material is about 25% by weight of the original charge and it may conveniently be discharged to a viscosity breaking reaction vessel or delivered to some other appropriate process. The overhead product from vaporizer 5 is discharged through line 10 into an injector 12. Meanwhile, catalyst, usually regenerated, rather than fresh catalyst from hopper 14 is discharged through a star feeder into line 15 and thence into injector 12. The flowing vapors in injector 12 cause the suspension of catalyst therein and this suspension is discharged into a line 16 leading into an insulated reaction drum 17. The amount of catalyst contained in the oil vapors in line 16 is from about ½ to 20 parts of catalyst per one part of oil by weight. The catalyst may be an acid treated clay, silica-alumina compositions, compounds or gels or some suitable cracking catalyst. The catalyst itself may be in the form of a relatively fine powder or it may be in the form of grains, granules, small lumps, shaped rods or the like. The catalyst discharged into the injector 12 may be hot regenerated catalyst at a temperature of from about 900° to 1000° F.

In reaction drum 17, the hydrocarbon vapors containing the catalyst are caused to remain resident in said vessel or drum for sufficient time to effect a substantial conversion of the gas oil into fractions boiling within the gasoline range, that is to say, they may remain in the reaction vessel for a period of from 5 to 50 seconds. The reaction vapors which have been maintained in the vessel 17 for sufficient time to effect the desired conversion are then discharged into line 18, thence into a cyclone separator 19. The overhead product from cyclone separator 19 is discharged into a line 20 and from there into a fractionating column 21. The overhead product from fractionating column 21 is discharged through line 22 into a condenser 23 and from there through line 24 into a receiving drum 25 where normally gaseous hydrocarbons are withdrawn through line 26 and gasoline is recovered through line 27.

Referring back to fractionating column 21, a heavy gas oil is withdrawn through line 48 and returned to line 18 for further treatment. Thus, residual catalyst in vapors passing to tower 21 is recovered and returned to cyclone 19 through line 48 and is recovered in cyclone 19 for subsequent treatment as herein described. A light gas oil is withdrawn through line 49 which gas oil may be used as a heating oil.

Referring at this point to cyclone separator 19, the catalyst separated from the oil vapors passes downwardly through the cone-shaped hopper 30 disposed immediately below cyclone separator 19, thence passes through a star feeder 31 into an injector 32. Meanwhile, steam or some other gas not containing substantial amounts of free oxygen at a temperature of say 825 to 900° F. is forced into injector 32 through line 35 where it disperses the catalyst and then the dispersion of catalyst in steam or other gas is withdrawn from the injector through line 36 and discharged into a coil 37 disposed in furnace setting 38. In this coil, the temperature of the catalyst is increased by radiation and convection from a burning fuel to a value such that the dispersion withdrawn from the coil through line 40 is at a temperature of about 1000° F. The pressure in line 36 may be about ten pounds per square inch gauge, there may be about a three-pound pressure drop through coil 37 so that the pressure in line 40 may be approximately about seven pounds per square inch gauge. During the passage of the catalyst suspended in steam through the coil 37, the tarry, pitchy deposit formed on the catalyst as a result of reaction occurring in vessel 17 is subjected to destructive distillation and cracking, forming normally gaseous hydrocarbons and a hydrogen-poor hydrocarbon residue which contains only about 1 to 5% of hydrogen. It should be pointed out that the temperature in coil 37 may be as high as from 1200-1400° F. which temperature range favors the water gas reaction, that is to say, where steam or carbon dioxide is present, the steam and the carbonaceous material reacted to form with the hydrogen-poor hydrocarbon, CO, $CO_2$, and hydrogen. In other words, according to temperature conditions, three types of reaction take place in coil 37 which are as follows:

1. A simple distillation where volatile hydrocarbons are distilled off the catalyst;
2. Cracking of non-volatile hydrocarbons to form saturated and unsaturated volatile hydrocarbons and;
3. Chemical reaction of hydrogen-poor hydrocarbons formed as a result of the cracking to form with steam or carbon dioxide, CO, $CO_2$ and hydrogen.

The products formed in coil 37 are discharged through line 40 as indicated and are then conducted to a cyclone separator 44 where a substantial portion of the catalyst is separated from the reaction products and then withdrawn through line 45 and discharged into an ejector 46. The overhead product from separator 44 is discharged through line 47 into line 20 leading as indicated into fractionating column 21. Steam is introduced into injector 46 through line 50 and causes the catalyst to be suspended in said steam and the suspension is discharged through line 51 into cyclone separator 52. The main purpose of cyclone separator 52 is to remove any volatile hydrocarbons mechanically admixed with the catalyst. In other words, separator 52 provides a final substantially complete purging of the catalyst from the hydrocarbons. The purged catalyst is withdrawn from separator 52 through a star feeder and discharged into a line 60 and hence into an injector 61 where it is dispersed in steam admitted through line 62. The dispersion of catalyst in steam is forced to a regeneration unit represented diagrammatically by the reference character 63. In the regeneration unit, the catalyst is subjected to a burning or oxidizing atmosphere where coke residues or other contaminants are removed, the products of combustion being removed through line 64. The regenerated catalyst is then withdrawn from 63 through a star feeder and discharged through line 65 into hopper 14 for reuse in the process. The catalyst in hopper 14 may or may not be purged of occluded oxygen as desired.

The volatile material removed from the catalyst in separator 52 is discharged from the separator into line 57 and then discharged into line 20 and eventually into fractionating tower 21.

Instead of causing the catalyst in steam dispersion formed in injector 32 to flow thereafter through coil 37, the dispersion may be fed directly into cyclone separator 44 in which case the steam entering through line 35 would have been previously superheated to 1200° F. or thereabouts.

A third alternative is to employ the gases withdrawn through line 64 as a heating means since these gases contain in addition to their sensible heat, substantial quantities of combustible material and hence these gases may be admixed with oxygen or air and burned in furnace 38.

A fourth alternative is to introduce a normally gaseous hydrocarbon such as butane into line 35, thence into injector 32 where it is admixed with the catalyst and the suspension or entrainment of catalyst in the gaseous hydrocarbon is withdrawn through line 36, discharged into the coil 37 where the hydrocarbon is cracked and isomerized to form a mixture which can subsequently be polymerized or alkylated. Under the following conditions in coil 37, a 65% yield of butylene is obtained from normal butane, of which 45% is isobutylene; temperature in the coil about 1200° F., time of contact within the coil about 30 seconds, pressure about 5 to 10 pounds per square inch gauge and an amount of catalyst 2 to 20 times the weight of the butane or other hydrocarbon fed to coil 37. In this modification, it is essential to provide a third cyclone separator 52 because the butane, butylene and isobutylene discharged from line 40 into separator 44 will not have been entirely separated from the catalyst in this latter cyclone separator.

The present invention relates to improvements in catalytic cracking, particularly that type of operation in which the catalyst is suspended in hydrocarbon vapors during the treatment. The main concept of the present invention involves heating the catalyst after separation of the same from the reacted hydrocarbons for the purpose of removing occluded, adsorbed, deposited and intermixed hydrocarbons from the catalyst without regard to the method employed for contacting the catalyst and hydrocarbons in the first instance. These hydrocarbons are removed by simple distillation, by cracking of non-volatile hydrocarbons to form more volatile products, by reaction of the hydrocarbons, which are poor in hydrogen, with steam or the like and finally by complete purging of the catalyst in the gaseous medium to remove hydrocarbons which may be said to be mechanically mixed with the catalyst.

It will be understood, of course, that the conditions prevailing in the reaction zone may vary according to the type of feed stock. That is to say, the temperature in reaction drum 17 may vary from about 900 to about 1400° F. and the pressure may vary from 5 to 25 or more pounds per square inch gauge. Furthermore, reaction drum 17 may be substituted by a coil and it may be desirable to provide heating means to supply the heat lost by the vapors in tranference from coil 3 to zone 17.

What I claim is:

1. In a process for the catalytic conversion of hydrocarbon oils in which the conversion is carried out in the presence of a finely-divided catalyst wherein the catalyst is caused to flow continuously and successively through a cracking zone and then through a regenerating zone in which combustible deposits formed on the catalyst during the conversion treatment are burned with an oxidizing gas and the catalyst then recycled to the conversion zone; a method of reducing the amount of combustible deposits to be burned during regeneration which comprises heating the conversion catalyst following the conversion treatment and before the regeneration treatment to a temperature substantially above the conversion temperature to volatilize a substantial portion of combustible constituents retained on said catalyst, and separating the volatilized material from the catalyst before passing the latter to said regenerating zone.

2. The process defined by claim 1 wherein the volatilized constituents removed from the catalyst are combined with the conversion products.

3. The process defined by claim 1 wherein the catalytic material is first separated from the conversion products before being heated.

4. The process defined by claim 1 wherein the catalyst is heated in admixture with a gaseous diluent.

5. In a process for cracking hydrocarbon oils in which the oil is cracked in the presence of a finely-divided cracking catalyst wherein the catalyst is caused to flow continuously and successively through a cracking zone and then through a regenerating zone and in which combustible deposits formed on the catalyst during passage through the cracking zone are burned by an oxidizing gas and the regenerated catalyst then returned to the cracking zone; the method of reducing the amount of combustible deposits contained on the catalyst to be regenerated which comprises heating said catalyst following the cracking treatment and prior to regeneration to a temperature materially above the cracking temperature to volatilize a substantial portion of combustible deposits retained on the catalyst, and separating the volatilized constituents from the catalyst before passing the latter to the regenerating zone.

6. In the process defined by claim 5, the further improvement which comprises heating said catalyst while in admixture with a gaseous medium.

CHARLES E. HEMMINGER.